United States Patent [19]

Peterson

[11] 3,851,522

[45] Dec. 3, 1974

[54] DECELERATION MEASURING APPARATUS

[75] Inventor: Clyde O. Peterson, Pittsburgh, Pa.

[73] Assignee: Westinghouse Electric Corporation, Pittsburgh, Pa.

[22] Filed: Jan. 31, 1973

[21] Appl. No.: 328,196

[52] U.S. Cl. .................................. 73/84, 73/517 R
[51] Int. Cl. ............................................. G01n 3/20
[58] Field of Search.......... 73/510, 514, 515, 516 R, 73/517 R, 94, 84, 82; 102/70.2

[56] References Cited
UNITED STATES PATENTS

| | | | |
|---|---|---|---|
| 3,298,222 | 1/1967 | Costello et al. | 73/517 R X |
| 3,339,404 | 9/1967 | Brooks et al. | 73/84 |
| 3,643,158 | 2/1972 | Kroner et al. | 73/517 R |
| 3,672,302 | 6/1972 | Shaw | 102/70.2 R |

*Primary Examiner*—James J. Gill
*Attorney, Agent, or Firm*—D. Schron

[57] ABSTRACT

Deceleration measuring apparatus is disclosed as comprising first and second deceleration measuring devices for providing outputs in response to measured first and second levels of deceleration, respectively. In an illustrative embodiment of this invention, the deceleration measuring devices may take the form of cantilever beams, each having a first end fixably secured and a second end suspended to be deflected under the influence of deceleration forces. Further, each deceleration measuring device includes a closing contact against which the second end of the cantilever beam closes when a predetermined deceleration level is sensed. The first deceleration measuring device has a cantilever beam of a first, relatively long length and closes in response to a relatively low, first level of deceleration. The second deceleration device includes a cantilever beam of a second, relatively short length which closes in response to a relatively high, second level of deceleration. Significantly, the time difference between the closing and therefore the output of the first and second deceleration measuring devices is indicative of the slope or the change of the deceleration to which these devices are subjected. In one illustrative embodiment, the first and second deceleration measuring devices are mounted within a projectile and its deceleration is determined by measuring the time interval between the outputs of the first and second deceleration measuring devices. In turn, the indicated deceleration is used to provide a measure of the density of the material struck by the projectile and to control the time of detonation of the explosives carried by the projectile.

8 Claims, 4 Drawing Figures

DECELERATION MEASURING APPARATUS

BACKGROUND OF THE INVENTION

1. Field of the Invention

This invention relates to apparatus for measuring the rate of change of deceleration and in particular, to such apparatus adapted to be mounted upon a projectile for determining the density or structure of an object struck by the projectile.

2. Description of the Prior Art

Present artillery projectiles include fuses operative in various detonate modes, dependent upon the density or structure of the intended projectile target. For example, if the intended target is made of an extremely hard material such as concrete, it would be desirable to delay detonation of the projectile's munition in order to allow some projectile penetration prior to detonation. In such a case, presently known artillery fuses are manually set by the gunner prior to launching, in a first or delay mode whereby detonation of the munition is delayed. On the other hand, if the intended target is comprised of a softer material such as earth, the gunner would set manually the artillery fuse in a second or "superquick" mode. In the superquick mode, the projectile is not permitted to penetrate deeply into the softer material before the munition is exploded. Thus, the explosive power of the munition is spent to achieve a maximum effect nearer the exposed surface of the softer material.

In many battlefield situations, it may be difficult, if not impossible, for the operator to judge accurately the structure or density of the intended target. Thus, the gunner may inaccurately set the artillery fuses and, as a result, the inaccurately set projectile may be wasted.

SUMMARY OF THE INVENTION

It is therefore an object of this invention to provide apparatus capable upon impact of measuring the density of the impacted object.

It is a further object of this invention to provide relatively simple, inexpensive apparatus for measuring the rate of deceleration whereby the density and/or construction of an impacted object is determined.

In accordance with the teachings of this invention, these and other objects are met by providing deceleration measuring apparatus comprising a first deceleration measuring device for providing an output in response to deceleration forces of a first level and a second deceleration measuring device for providing a second output in response to deceleration forces of a second, higher level. Significantly, by measuring the time difference between the occurrence of the first and second outputs, the change of deceleration is indicated. In an illustrative embodiment of this invention, the first output enables the counting by a counter of clock pulses derived from an oscillator and the second output terminates the counting of the clock pulses by the counter, whose output is an indication of the time difference between the first and second outputs and therefore the change of the decelerating forces imposed upon the first and second deceleration measuring devices.

In one illustrative embodiment of this invention, such deceleration measuring apparatus is incorporated into a projectile to measure the rate of deceleration of the projectile upon impact with a target object. The deceleration, in turn, is indicative of the material of which the target object is made and this indication is used to set a munition carried by the projectile to time accurately the detonation of the munition dependent upon the construction of the target object.

In another illustrative embodiment of this invention, the first and second deceleration measuring devices may each take the form of a cantilever beam secured at one end with the other end free to be deflected under the influence of decelerating forces to contact an electrical contact, whereby a circuit is completed at a given instant in time. The lengths of the cantilever beams are determined selectively to be different so that the outputs of the first and second deceleration measuring devices correspond to the first and second deceleration levels.

BRIEF DESCRIPTION OF THE DRAWINGS

These and other objects and advantages of the present invention will become more apparent by referring to the following detailed description and accompanying drawings, in which.

DESCRIPTION OF THE PREFERRED EMBODIMENTS

Figure 1:
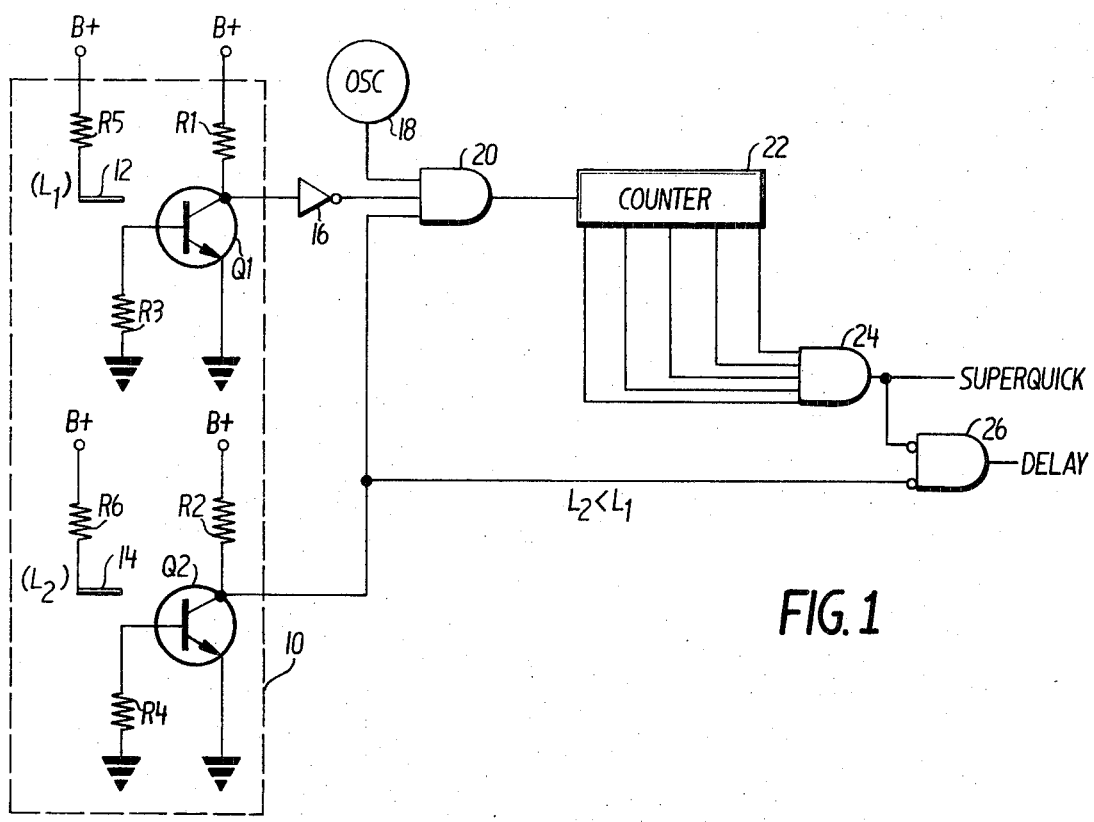
FIG. 1 is a schematic diagram of a circuit incorporating the first and second deceleration measuring devices in accordance with teachings of this invention to provide an indication of the time difference between the occurrence of the outputs of these devices.

With regard to the drawings and in particular to FIG. 1, there is shown a circuit diagram in accordance with the teachings of this invention, incorporating a digital decelerometer assembly 10 comprising first and second deceleration measuring devices 12 and 14. Illustratively, each of the deceleration measuring devices 12 and 14 may comprise a cantilever beam of selected length. Upon being subjected to deceleration forces of a predetermined level, the free end of the cantilever beams will close against an electrical contact. As shown in FIG. 1, the cantilever beam of the deceleration measuring device 12 closes to make contact with the base of a transistor Q1, whereas the cantilever beam of the deceleration measuring device 14 closes to make contact with a transistor Q2. A B+ biasing source is applied through biasing resistors R5 and R6 to the cantilever beams of both the deceleration measuring devices 12 and 14, respectively. The base of transistor Q1 is connected through a resistive element R3 to ground, whereas the emitter and collector of transistor Q1 are connected, respectively, to ground and through a resistive element R1 to the biasing source B+. In a similar manner, the base of transistor Q2 is connected through a resistive element R4 to ground, whereas the emitter and collector thereof are connected, respectively, to ground and through a resistive element R2 to the biasing source B+.

The output of the first deceleration measuring device 12 is taken from the collector of transistor Q1 and applied through an inverting amplifier 16 to one input of an AND gate 20. In a similar manner, the output of the second deceleration measuring device 14 is taken from the collector of transistor Q2 and applied to another input of the AND gate 20. As shown in FIG. 1, an oscillator 18 is connected to the other input of the AND gate 20 to apply thereto a clock pulse of selected frequency. When enabled by the outputs of the transistors Q1 and Q2, the clock pulse derived from the oscillator 18 is applied through the AND gate 20 to be counted by a counter 22. The counter 22 may be of a type well-known in the art and in the illustrative embodiment shown in FIG. 2, has a plurality of outputs upon which appear in binary form an indication of the count of the counter 22. In turn, the outputs of the counter 22 are applied to an AND gate 24, which, in response to input signals of all 1's, provides an output signal identified by the designation "super-quick." Further, the output of the AND gate 24 is also applied to one input of a NOR gate 26; the other input to the NOR gate 26 is derived from the collector of transistor Q2. The outputs of the counter 22 are set to indicate all 1's in response to counting a predetermined number of pulses as applied through the enabled AND gate 20 from the oscillator 18.

In an illustrative embodiment of this invention, the deceleration measuring apparatus as shown in FIG. 1 may be incorporated into a projectile or other moving vehicle for determining the rate of deceleration of the projectile upon impact with a target object and further, the density and/or construction of the impacted target object. In an illustrative method of operation, the transistors Q1 and Q2 are rendered non-conductive, respectively, by the resistive elements R3 and R4 before impact and closure of the cantilever beams associated with the deceleration measuring devices 12 and 14. As a result, a high output is derived from the collector of transistor Q1 and inverted by the inverting amplifier 16 to disable AND gate 20 and to prevent the application of the clock pulses derived from the oscillator 18 to the counter 22. The high output derived from the transistor Q2 is applied to disable the NOR gate 26.

Upon impact of the projectile, the decelerating forces are applied to the decelerating devices 12 and 14. Significantly, the deceleration measuring devices 12 and 14 are set to provide outputs in response to deceleration forces of a first, relatively low level and a second, higher level, respectively. In a manner to be explained more thoroughly, the cantilever beam incorporated into the deceleration measuring device 12 is made longer than that cantilever beam incorporated into the deceleration measuring device 14, whereby upon being subjected to increasing deceleration forces, the cantilever beam of the device 12 will close first, and thereafter, the cantilever beam associated with acceleration measuring device 14 will close. Upon closure of its cantilever beam, the deceleration measuring device 12 will provide a low output upon the collector of the transistor Q1 to apply a high signal to the AND gate 20. Since the cantilever beam of the device 14 has not yet closed, its output as applied to the AND gate 20 is high whereby the AND gate 20 is enabled to apply the clock pulses derived from the oscillator 18 to the counter 22.

As the deceleration forces increase, the cantilever beam associated with the second deceleration measuring device 14 closes, whereby the output derived from the collector of the transistor Q2 goes low to disable the AND gate 20 and to apply a low signal to the NOR gate 26. As explained above, the counter 22 is set to provide a plurality of all 1's signals upon its outputs if a predetermined number of clock pulses are applied thereto. In other words, if a sufficient number of pulses or lapse of time has occurred between the output of the first deceleration measuring device 12 and the output of the second deceleration measuring device 14, a high will be derived from the AND gate 24. The count of the counter 22 is set in a manner to be explained, indicative of the deceleration and the density of the material impacted by the projectile. Further, if upon occurrence of the output from the second deceleration measuring device 14 the counter 22 has counted out, the AND gate provides a pulse signal to initiate the "super-quick" detonate mode and also applies a high signal to the NOR gate 26. However, if the deceleration is sufficiently high, the counter 22 will not have reached its predetermined count and a low signal will be applied to the NOR gate 26, whereby a high or delay signal will be derived to initiate a "delay" detonate mode.

Figure 2:
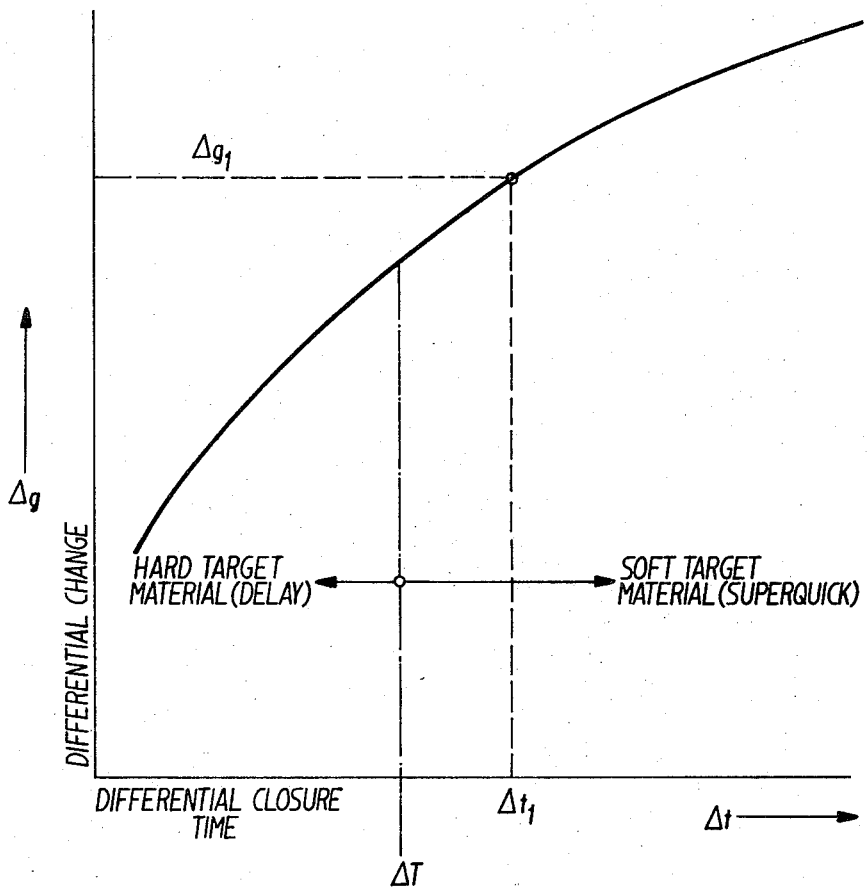
FIG. 2 is a graph indicating the change in deceleration as a function of the differential closure time whereby an indication of the density of the impacted material is provided.

With regard to FIG. 2, the manner in which the predetermined count of the counter 22 is set will now be explained. FIG. 2 is a graph of $\Delta g$, the difference in the deceleration levels at the occurrence of the outputs of the first and second acceleration measuring devices, versus $\Delta t$, the time difference between the occurrence of the outputs from the devices 12 and 14. As explained above, the outputs from the first and second deceleration measuring devices 12 and 14 are derived at times corresponding to these devices being subjected to deceleration forces of first and second levels, the first level being less than the second level. An interpretation of the curve of FIG. 2 will be made with respect to the point $(\Delta g_1, \Delta t_1)$. The ratio $\Delta g_1/\Delta t_1$ represents the initial slope of a deceleration impulse function that is impressed upon the deceleration measuring devices 12 and 14. Since the curve of FIG. 2 is a monotonically increasing function, i.e. as $\Delta g$ increases, $\Delta t$ increases without reversion, the measurement only of $\Delta t$ will result in a quantative measure of the initial slope of the deceleration impulse. In other words, by determining the time difference $\Delta t$ between the occurrence of the outputs of the deceleration measuring devices 12 and 14, an indication of the slope or deceleration may be derived. Therefore, by selecting a $\Delta t$, for example $\Delta T$, a reference point is established such that for measured values of $\Delta t$ less than $\Delta T$, an indication of relatively hard or dense materials is given and for measured values of $\Delta t$ larger than $\Delta T$, an indication of relatively soft or less dense materials is given. Thus, with regard to FIG. 1, the predetermined count of counter 22 is set corresponding to $\Delta T$, whereby if the occurrence of the outputs derived from the first and second deceleration measuring devices 12 and 14 is greater than $\Delta T$, an indication that the impacted target is made of a softer or less dense material is given. On the other hand, if the time period between the occurrence of the outputs of the devices 12 and 14 is less than $\Delta T$ corresponding to the predetermined count of counter 22, then an indication is provided that the material of the impacted target object is relatively hard.

Thus, in the illustrative embodiment wherein the deceleration measuring apparatus as shown in FIG. 1 is incorporated into a projectile, if the time difference between the occurrence of the signals derived from the devices 12 and 14 is greater than the chosen ΔT, the counter 22 will count out and the AND gate 24 will provide a high output, in a manner as explained above, indicative that the impacted target is made of a relatively soft material. As a result, the fuse (not shown) associated with the deceleration measuring apparatus as shown in FIG. 1 may be set to detonate in a "superquick" mode, whereby penetration of the missile is prevented before the ammunition is exploded. On the other hand, if the output of the transistor Q2 of the decelerating measuring device 14 changes from a high to a low logic level before the counter 22 has counted out, i.e., Δt is less than ΔT, the output applied to the NOR gate 26 from the AND gate 24 will be low, in addition to the low logic level signal derived from the transistor Q2. As a result, a high output signal will be derived from the NOR gate 26 indicating that the material of the impacted target is relatively hard. The high signal derived from the NOR gate 26 may be used to operate the artillery fuse in a delayed mode wherein the detonation of the ammunition is delayed until the projectile has penetrated the target object by a given amount to maximize the effect of the explosion.

Figure 3:
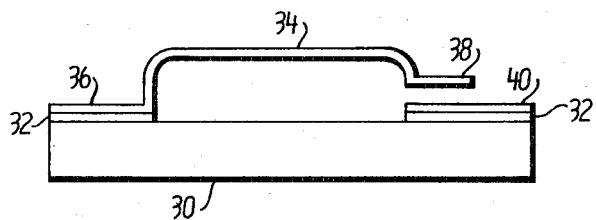
FIG. 3 is a sectioned view of a deceleration measuring device as may be incorporated into the circuitry of FIG. 1.

The deceleration measuring devices 12 and 14 as shown in FIG. 1 may illustratively take the form of the device shown in FIG. 3, wherein the closure time of a cantilever beam 34 is indicative of the decelerating forces to which the device is subjected. In particular, the cantilever beam 34 is fixedly supported by an end portion 36 upon a substrate 30 made of an illustrative material such as silicon. The other end of the cantilever beam 34 assumes a "hammer shape" including an end contact portion 38 which, upon closure of the cantilever beam 34, contacts an output electrode 40 whereby a circuit is completed between the input portion 36 and the output electrode 40. The cantilever 34 including the input portion 36 and the output electrode 40, is made of a suitable, electrically conductive material such as gold. As will be explained later, an intermediate layer 32 of an illustrative material, such as titanium, is inserted between the input portion 36 and the substrate 30 and the output electrode 40 and the substrate 30. In one illustrative embodiment of this invention, the cantilever beams are made of a cross-section of 1 μm × 10 μm of gold and spaced from the substrate 30 a distance of approximately 6 μm.

As seen in FIG. 3, the unsupported contact portion 38 of the cantilever beam 34 is deflected by deceleration forces due to its inertial mass to complete or close an electrical circuit upon contact with the output electrode portion 40. This device is a true bidirectional decelerometer since it indicates the passing of the threshold regardless of in what direction the threshold is approached. If the cantilever beam 34 has a length L, width W and thickness T, the relationship between the gravitational forces acting on it and its tip deflection $\gamma_{max}$ is given by the formula:

$$\gamma_{max} = 3/2 \; \rho/E \; L^4/t^2 \; a$$

where $a$ is the acceleration in $g$'s, $\rho$ is the density of the beam material and E is Young's modulus of elasticity. The thickness and the spacing $\gamma_{max}$ can be conveniently made constant by planar processing to permit the fabrication of cantilever beams with different lengths corresponding to different deceleration levels. In this case, the product "$L^4a$" remains constant and a variation only of the beam length suffices to change the deceleration detection level at which the cantilever beam 34 closes to complete the circuit. Because of the fourth power dependence $L^4$, a moderate variation of L can shift the detection level over a broad range of over three orders of magnitude. The maximum detectable deceleration level is determined by the lower limit for L for which the internal bending stresses reach the tolerable elastic limit and any further bending causes a permanent deformation resulting in a decreased equilibrium spacing and therefore in a changed detection level. Thus, in accordance with teachings of this invention, the cantilever beams of the deceleration measuring devices 12 and 14 are made of the same width and thickness and of the same material, i.e., the same Young's modulus of elasticity, so that the lengths of the beams incorporated into the devices 12 and 14 may be made of a slightly different length whereby the deceleration levels required to close the cantilever beams are determined to be of a first, relatively low level and a second, relatively high level.

Maintaining the other dimensions equal, it is contemplated in a preferred embodiment of this invention to determine the lengths of the cantilever beams to be within 5 percent of each other whereby the times of closure and therefore the time difference of the closures will be substantially linearly dependent upon the change of deceleration forces imposed upon the cantilever beams. It is understood, that the time of closure is dependent upon the resonant frequency of a particular cantilever beam which is a non-linear function of its length; as a result, if the lengths of the cantilever beams incorporated into the deceleration measuring devices 12 and 14 differ from each other by more than 5 percent, the measurements of Δt obtained therefrom will not achieve the desired accuracy. Cantilever beams have been made of lengths in the order of 250 to 400μm. In those embodiments of this invention wherein the deceleration measuring apparatus is to be incorporated into a projectile, the lengths are determined so that the resultant Δt's as measured by the circuit of FIG. 1 will be in the order of 1 to 100 microseconds.

Illustratively, the deceleration measuring device 12 as shown in FIG. 3 may be made utilizing conventional fabricating techniques including the step of evaporating the layer 32 of titanium upon the substrate 30 of silicon. Thereafter, a second layer of gold forming the input portion 36 and the output electrode 40 is disposed upon the titanium layer. The delineation of these portions is made by a photolithographic process with a mask and a photoresist processing. After exposing the mask and developing the photoresist, the gold is etched off in the open areas leaving only a desired configuration for the input portion 36 and the output electrode 40. Thereafter, a first nickel layer is deposited upon the titanium everywhere that the gold has been etched away previously. The thickness of the nickel layer is made half the spacing desired between the cantilever beam 34 and the substrate 30. Thereafter, the photoresist is removed, a new photoresist is disposed on the surface and the second mask is put down, masking all areas except where the portion 36 and electrode 40 are going to be. A second layer of nickel is electrodeposited and the thickness of this layer determines the final spacing $\gamma_{max}$ between the tip of the cantilever beam 34 and the associated electrode 40. The photoresist is again removed and a new layer is disposed over the slice and exposed with the third and last mask such that the resist is removed down to the second nickel layer everywhere the beams and their anchor portions 36 are to be plated. During this gold plating step, a gold layer with an illustrative thickness of 1.5μm is deposited, which is a compromise between the requirement of flexibility of the beam and the technological difficulty in fabricating a thin beam. Hereupon the resist is stripped and the nickel spacer is etched out yielding a suspended cantilever beam. A final etching step for titanium is further required, to eliminate the electrical interconnection between the contact members, beam and contact pad. A subsequent rinse cycle in deionized water followed by a bath in a low surface tension solvent completes the process.

Figure 4:
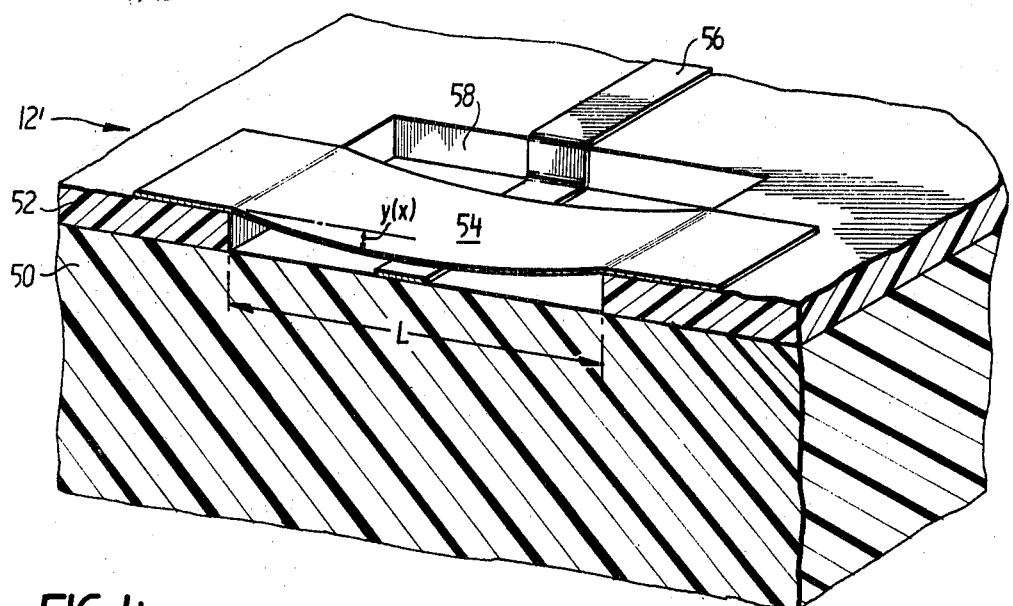
FIG. 4 is a perspective view of another embodiment of a deceleration measuring device that may be incorporated into the circuitry of FIG. 1.

With regard to FIG. 4, there is shown another embodiment of the acceleration measuring devices that may be incorporated into the circuit of FIG. 1. In particular, the acceleration measuring device 14' includes a substrate 50 made of a suitable material such as silicon upon which there is disposed a layer 52 made of a suitable insulating material such a silicon oxide. An output electrode 56 is disposed within an opening 58 formed within the insulating layer 52, and a beam 54 is supported at both of its ends upon the layer 52 to extend across the opening 58 in a spaced relation with the output electrode 56. When the lever 54 is subjected to accelerating forces, it will be deflected a predetermined amount to make contact with the output electrode 56. The maximum deflection of the beam 54 occurs at its center point or at a position ½, where L is equal to the length of the unsupported portion of the beam 54. The $\gamma_{max}$ is calculated as a function of the accelerating or $g$ forces applied thereto in accordance with the following equation:

$$\gamma_{max} = eL^4/32t^2E \; (1 + a/g),$$

where "L" is the unsupported length of the beam 54, $e$ is the density of the material of which the beam 54 is made, $t$ is time, $g$ is the gravitational forces imposed upon the lever and $a$ is the accelerating forces applied thereto. By inspection of this equation, it may be seen that the deflection of the beam 54 is an extremely strong function of the length, i.e., $\gamma_{max}$ approximates $L^4$. Thus, the deflection of the beam 54 due to deceleration forces is determined by the selected length of the beam 54, and the closure of the beam 54 upon the contact 56 may be made a function of the acceleration forces to which the device 12' is subjected.

In the illustrative embodiments of the acceleration measuring devices as shown in FIGS. 3 and 4, the cantilever beams are supported from a silicon substrate. Thus, it is within the contemplation of this invention, that the various circuit elements as shown in FIG. 1 may be formed by large-scale integration techniques upon a common substrate.

Though the circuit shown in FIG. 1 shows but two acceleration measuring devices, it is understood that more than two such acceleration measuring devices may be used to calculate in a manner similar to that shown in FIG. 1, a corresponding plurality of time differences, whereby a plurality of explosives may be detonated in a predetermined sequence and/or at predetermined time delays with respect to each other.

Thus, there has been shown and described herein apparatus for measuring the rate of change of acceleration by a relatively simple, inexpensive structure including first and second deceleration measuring devices responsive to first and second levels of deceleration forces to provide corresponding outputs. By measuring the time interval between the occurrence of the outputs of the aforementioned devices, the change of deceleration is measured. Significantly, the density of a material impacted with a missile is determined by measuring the change of deceleration of the impacting missile. Thus, in accordance with the teachings of this invention, the measurement of the aforementioned time interval is used to determine the structure and/or the density of the impacted material.

Numerous changes may be made in the above-described apparatus and the different embodiments of the invention may be made within departing from the spirit thereof; therefore, it is intended that all matter contained in the foregoing description and in the accompanying drawings shall be interpreted as illustrative and not in a limiting sense.

What is claimed is:

1. Apparatus to be carried by a moving vehicle for providing an indication of the density of a target impacted by the vehicle by measuring the change of the deceleration forces applied to said apparatus upon impact of the vehicle with the target, said apparatus comprising:
    a. first and second means for generating first and second outputs upon the occurrences of deceleration forces of first and second levels, respectively, said first level being less than said second level; and
    b. means responsive to said first and second output signals for measuring the time interval therebetween whereby the rate of change of the deceleration forces imposed on the vehicle is determined to provide an indication of the density of the impacted target.

2. Apparatus as claimed in claim 1, wherein said interval measuring means provides a first signal in response to the measurement of an interval between said first and second outputs of less than a predetermined value to indicate a more dense impacted target and a second signal in response to the measurement of an interval between said first and second outputs greater than said predetermined value to indicate a less dense impacted target.

3. Apparatus in accordance with claim 1, wherein said interval measuring means includes oscillator means for providing a train of clock pulses, counting means for counting said clock pulses, and switching means responsive to the presence of said first output and to the absence of said second output to apply said counting pulses to said counting means to initiate its counting operation and responsive to the presence of said second output to terminate the application of said clock pulses to said counting means.

4. Deceleration measuring apparatus as claimed in claim 3, wherein said counting means is responsive to a predetermined count of said clock pulses selected to indicate a predetermined density of the impacted target to provide a counter output signal indicative that the density of the impacted target is not greater than said predetermined density, and second switch means responsive to the absence of said counter output signal and to the presence of said second output to provide a signal indicative that the density of the impacted target is greater than said predetermined density.

5. Deceleration measuring apparatus to be carried by a moving vehicle for providing an indication of the change of the deceleration forces applied thereto upon impact of the vehicle with a target, said deceleration measuring apparatus comprising:

a. first and second means for generating first and second outputs in response to the occurrences of deceleration forces of first and second levels, respectively, said first level being less than said second level, said first deceleration responsive means including a first beam of a first length selected to be deflected in response to deceleration forces of said first level a predetermined distance, said second deceleration responsive means including a second beam of a second length selected to be deflected in response to deceleration forces of said second level said predetermined distance; and b. means responsive to said first and second output signals for measuring the time interval therebetween whereby the rate of change of the deceleration forces imposed upon the vehicle is determined.

6. Deceleration measuring apparatus as claimed in claim 5, wherein said first and second beams each include a first end fixedly supported and a second end freely suspended to be deflected under deceleration forces.

7. Deceleration measuring apparatus as claimed in claim 5, wherein said first and second beams each include first and second ends fixedly supported and a central portion to be deflected in response to deceleration forces.

8. Deceleration measuring apparatus as claimed in claim 5, wherein said first and second deceleration responsive means each includes a contact electrode against which said first and second beams are deflected to complete a circuit in response to the deceleration forces.

* * * * *